United States Patent
Kuo et al.

(10) Patent No.: US 12,089,774 B2
(45) Date of Patent: Sep. 17, 2024

(54) BREWING VESSEL

(71) Applicant: Maikenmen LLC, Torrance, CA (US)

(72) Inventors: Ying-Ting Kuo, Taitung County (TW);
Ken-Soh Mai, San Marino, CA (US);
Charles Mai, San Marino, CA (US)

(73) Assignee: MAIKENMEN LLC, Torrance, CA (US)

( * ) Notice: Subject to any disclaimer, the term of this patent is extended or adjusted under 35 U.S.C. 154(b) by 652 days.

(21) Appl. No.: 17/208,764

(22) Filed: Mar. 22, 2021

(65) Prior Publication Data

US 2021/0386235 A1   Dec. 16, 2021

(30) Foreign Application Priority Data

Jun. 12, 2020 (CN) .......................... 202021083570.9

(51) Int. Cl.
*A47J 31/06* (2006.01)

(52) U.S. Cl.
CPC ....... *A47J 31/0615* (2013.01); *A47J 31/0626* (2013.01)

(58) Field of Classification Search
CPC .......................... A47J 31/0615; A47J 31/0626
See application file for complete search history.

(56) References Cited

U.S. PATENT DOCUMENTS

| 2012/0160107 A1* | 6/2012 | Tien ..................... A47J 31/061 |
| | | 99/298 |
| 2013/0312621 A1* | 11/2013 | Liu ......................... A47J 31/18 |
| | | 99/323 |

FOREIGN PATENT DOCUMENTS

| CN | 207285792 U | 5/2018 |
| CN | 209090644 U | 7/2019 |

* cited by examiner

*Primary Examiner* — Nathaniel E Wiehe
*Assistant Examiner* — Keith Brian Assante
(74) *Attorney, Agent, or Firm* — Muncy, Geissler, Olds & Lowe, P.C.

(57) ABSTRACT

A brewing vessel comprises a brewing vessel body and an inner structure positioned in the brewing vessel body, wherein the inner structure is provided with a primary filter. The brewing vessel comprises a secondary filter positioned corresponding to the inner structure. The mesh of the secondary filter has filtration holes smaller than that of the primary filter, and the secondary filter filters out at least some coffee sediment that failed to be filtered by the primary filter.

8 Claims, 5 Drawing Sheets

BREWING VESSEL

FIELD OF THE INVENTION

The invention relates to a brewing vessel, in particular, a brewing vessel with a secondary filter.

BACKGROUND OF THE INVENTION

Conventional brewing vessels, which are disclosed in Chinese Patents Nos CN 209090644 U and CN 207285792 U, only perform a single filtration and are unable to filter out coffee sediment in the coffee fluid thoroughly. When the diameter of filtration holes in a conventional brewing vessel is not properly designed, the coffee sediment may not be reliably blocked and will flow out along with the coffee fluid, or the coffee sediment may block the filtration holes and affect the filtering structure's filtering ability, or the concentration of cold brew made in the brewing vessel may be affected.

SUMMARY OF THE INVENTION

The main object of the present disclosure is to solve the above-mentioned problems caused by flaws of the conventional brewing vessel.

In order to achieve this object, the present invention provides a brewing vessel which comprises a brewing vessel body and an inner structure positioned in the brewing vessel body, wherein the inner structure is provided with a primary filter. The brewing vessel also comprises a secondary filter positioned relative to the inner structure. The mesh of the secondary filter has filtration holes smaller than that of the primary filter, and the secondary filter filters out at least some coffee sediment that failed to be filtered by the primary filter.

In some embodiments, the secondary filter is positioned at the bottom of the inner structure.

In some embodiments, the brewing vessel comprises an outer structure that encloses the inner structure therein and is connected to the secondary filter, and the outer structure restricts liquid flowing out the primary filter to flow through the secondary filter only.

In some embodiments, the distance between the bottom of the outer structure and the brewing vessel body is greater than the distance between the bottom of the inner structure and the brewing vessel body, and the secondary filter is positioned at a slanted angle.

In some embodiments, the distance between the bottom of the outer structure and the brewing vessel body is less than the distance between the bottom of the inner structure and the brewing vessel body, and the secondary filter is positioned at a slanted angle.

In some embodiments, the primary filter comprises a plurality of through-holes located along the surface of the inner structure, and the secondary filter is provided with a filter screen.

In some embodiments, the brewing vessel further comprises a base plate that is connected to the filter screen and positioned at the bottom of the inner structure.

In some embodiments, of the base plate and the bottom of the inner structure, at least one contains a connecting structure, and the inner structure can be selectively assembled with or disassembled from the base plate via the connecting structure.

Accordingly, the present invention has the following unique characteristics compared with conventional technology: at least some coffee sediment that is failed to be filtered by the primary filter is filtered out by the secondary filter.

DETAILED DESCRIPTION OF THE PREFERRED EMBODIMENTS

The detailed description and technical contents of the present invention will now be provided with reference to the drawings.

Figure 1:
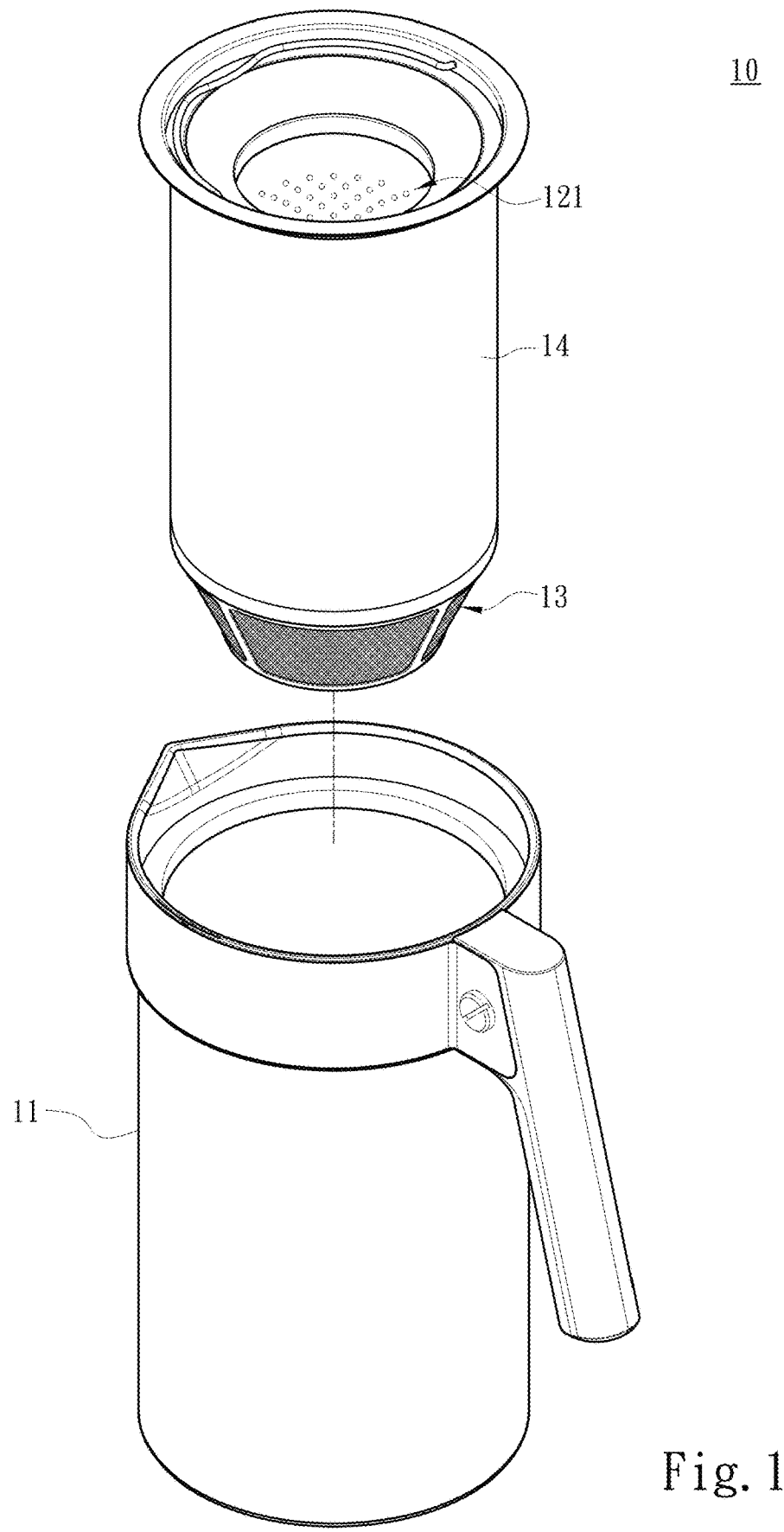
FIG. 1 is a schematic structural exploded view of one embodiment of the present invention.
Figure 2:
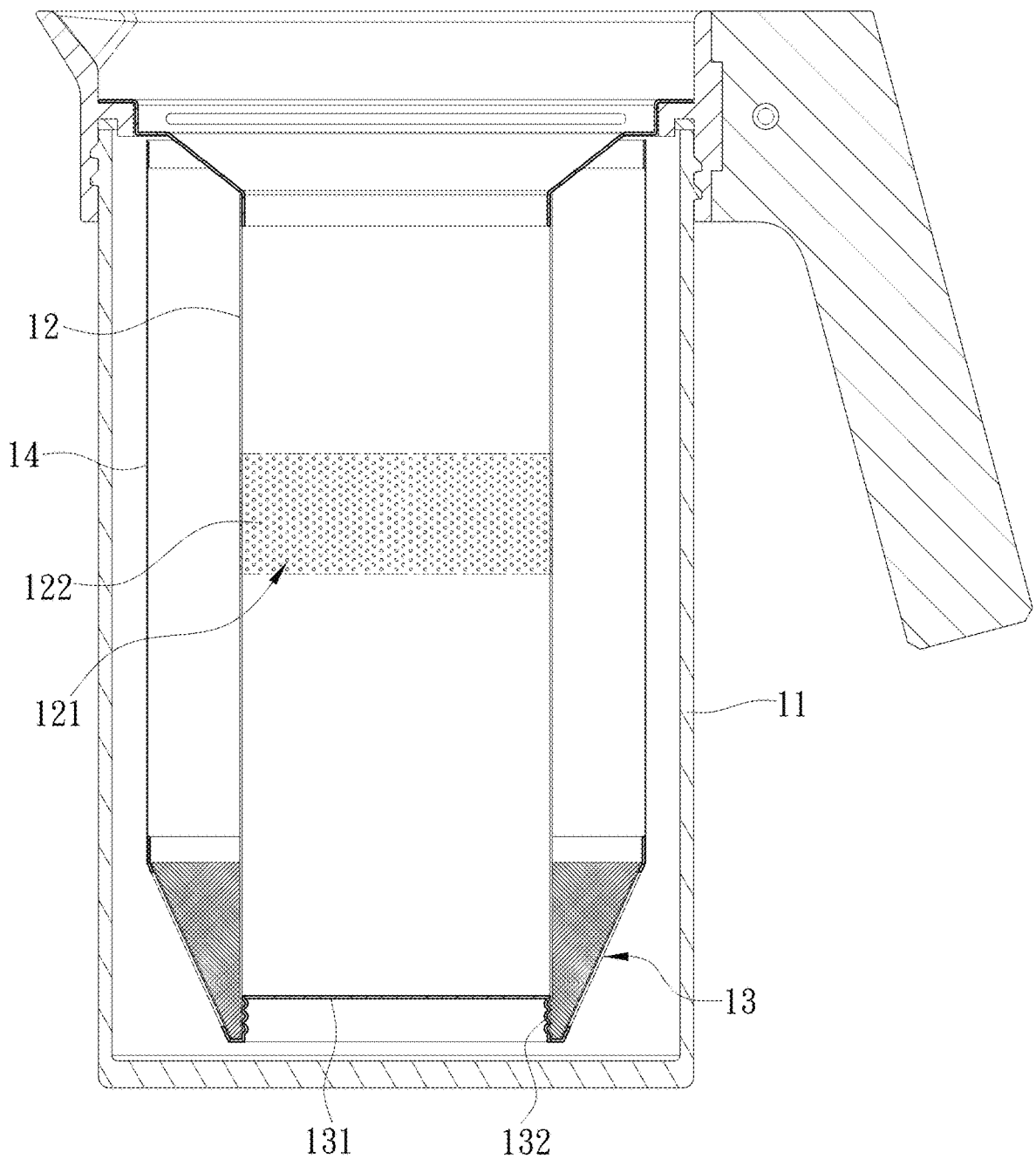
FIG. 2 is a schematic structural cross-sectional view of one embodiment of the present invention.
Figure 3:
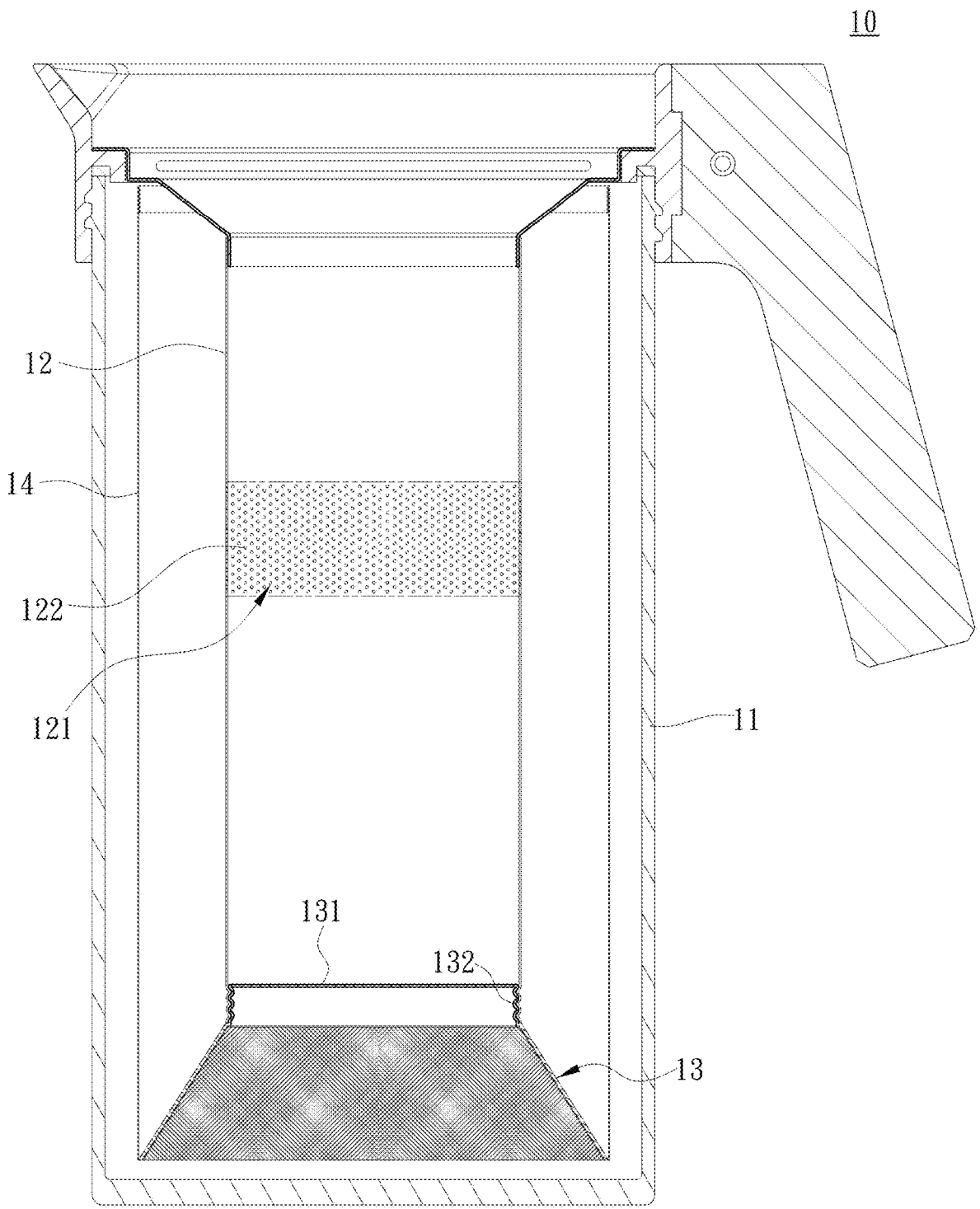
FIG. 3 is a schematic structural cross-sectional view of another embodiment of the present invention.
Figure 4:
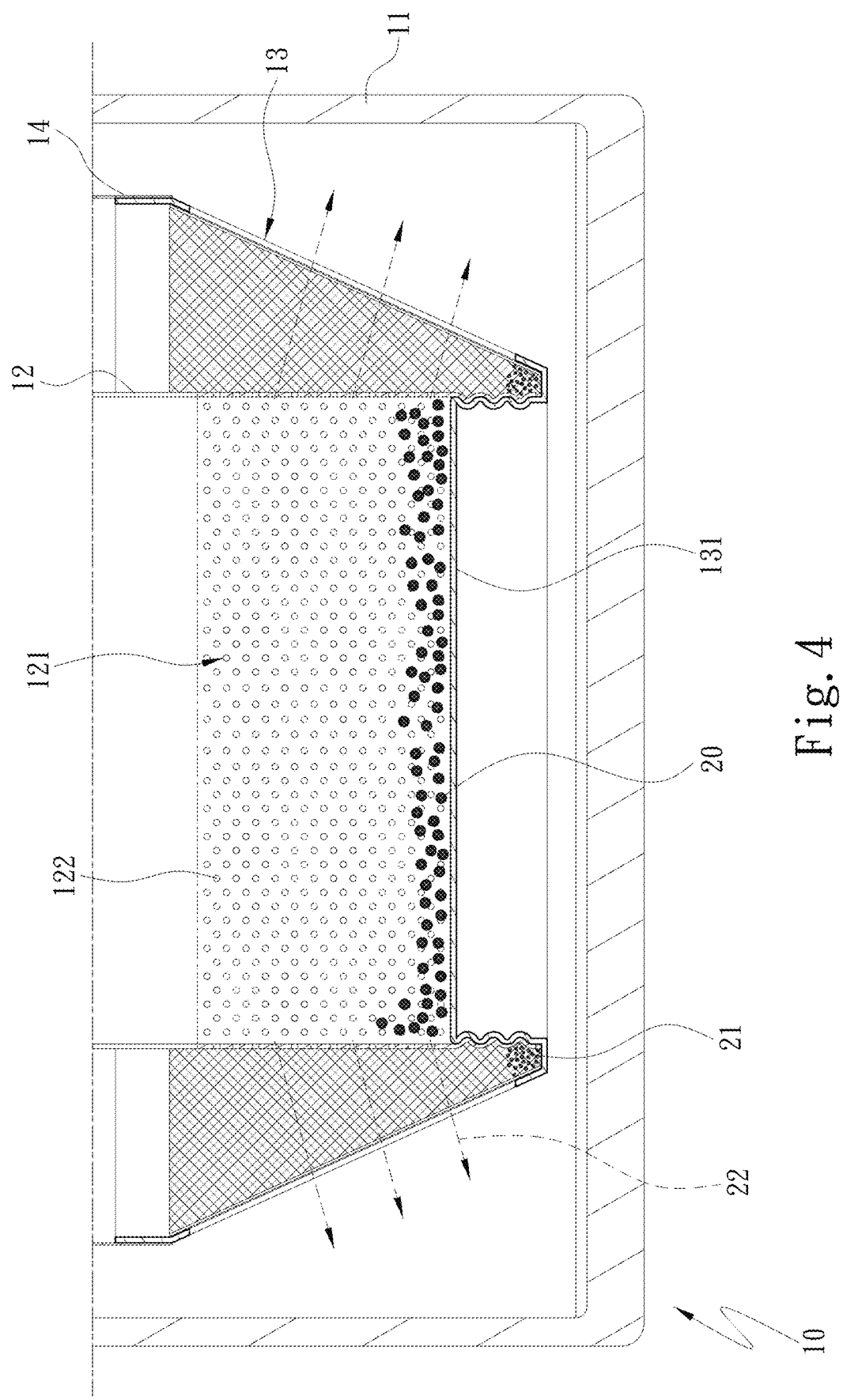
FIG. 4 is a schematic implementation view of one embodiment of the present invention.

Referring to FIG. 1, FIG. 2, FIG. 3 and FIG. 4, the present invention provides a brewing vessel 10 which is used for brewing, cold-brewing or infusing coffee or tea. Further, the brewing vessel 10 comprises a brewing vessel body 11 and an inner structure 12. The brewing vessel body 11 is not the focus of the present invention and can be designed by one skilled in the relevant art based on experience or user requirements, so it will not be described in detail herein. The inner structure 12 is positioned in the brewing vessel body 11, and the inner structure 12 can be selectively taken out from the brewing vessel body 11. The inner structure 12 is provided with a primary filter 121 for performing a primary filtration in the brewing vessel 10, and the primary filter 121 comprises a plurality of through-holes 122 located on the surface of the inner structure 12 as shown in FIG. 3. Further, the brewing vessel 10 includes a secondary filter 13 which is positioned relative to the inner structure 12, and the filtering function of the secondary filter 13 is the same as that of the primary filter 121. In some embodiments, the secondary filter 13 is provided with a filter screen which includes a mesh with filtration holes smaller than the plurality of through-holes 122 of the primary filter 121.

Referring to FIG. 1, FIG. 2, FIG. 3 and FIG. 4, an embodiment of the brewing vessel 10 is described herein. In this embodiment, as an example, the brewing vessel is used to brew coffee. First, the inner structure 12 is filled with coffee grounds 20, and the brewing vessel body 11 is filled with water. After a period of time, the primary filter 121 of the inner structure 12 preliminarily filters the coffee grounds 20 and causes a coffee fluid 22 to seep out, with the coffee fluid 22 containing at least some coffee sediment 21. Thereafter, the secondary filter 13 secondarily filters the at least some coffee sediment 21 out of the coffee fluid 22 via the mesh, so that the filtered coffee fluid 22 is purer as it contains less coffee sediment 21. That is, the secondary filter 13 filters the at least some coffee sediment 21 which failed to be filtered by the primary filter 121, therefore overcoming a flaw of conventional brewing vessels.

In this embodiment, the secondary filter 13 is positioned between the brewing vessel body 11 and the inner structure 12, and one end of the secondary filter 13 is connected to the inner structure 12. In one embodiment, the secondary filter 13 is positioned at the bottom of the inner structure 12.

In one embodiment, the brewing vessel 10 further comprises an outer structure 14 enclosing the inner structure 12 therein. The outer structure 14 is connected to one end of the secondary filter 13 which is not connected to the inner structure 12, and the outer structure 14 restricts the coffee fluid 22 flowing out the primary filter 121 to flow through the secondary filter 13 only. Further, the distance between the bottom of the outer structure 14 and the brewing vessel body 11 is greater than the distance between the bottom of the inner structure 12 and the brewing vessel body 11, as shown in FIG. 2. In another embodiment, the distance between the bottom of the outer structure 14 and the brewing vessel body 11 is less than the distance between the bottom of the inner structure 12 and the brewing vessel body 11, as shown in FIG. 3. Additionally, two ends of the secondary filter 13 are respectively connected with the outer structure 14 and the inner structure 12, so that the secondary filter 13 is positioned at a slanted angle.

Figure 5:
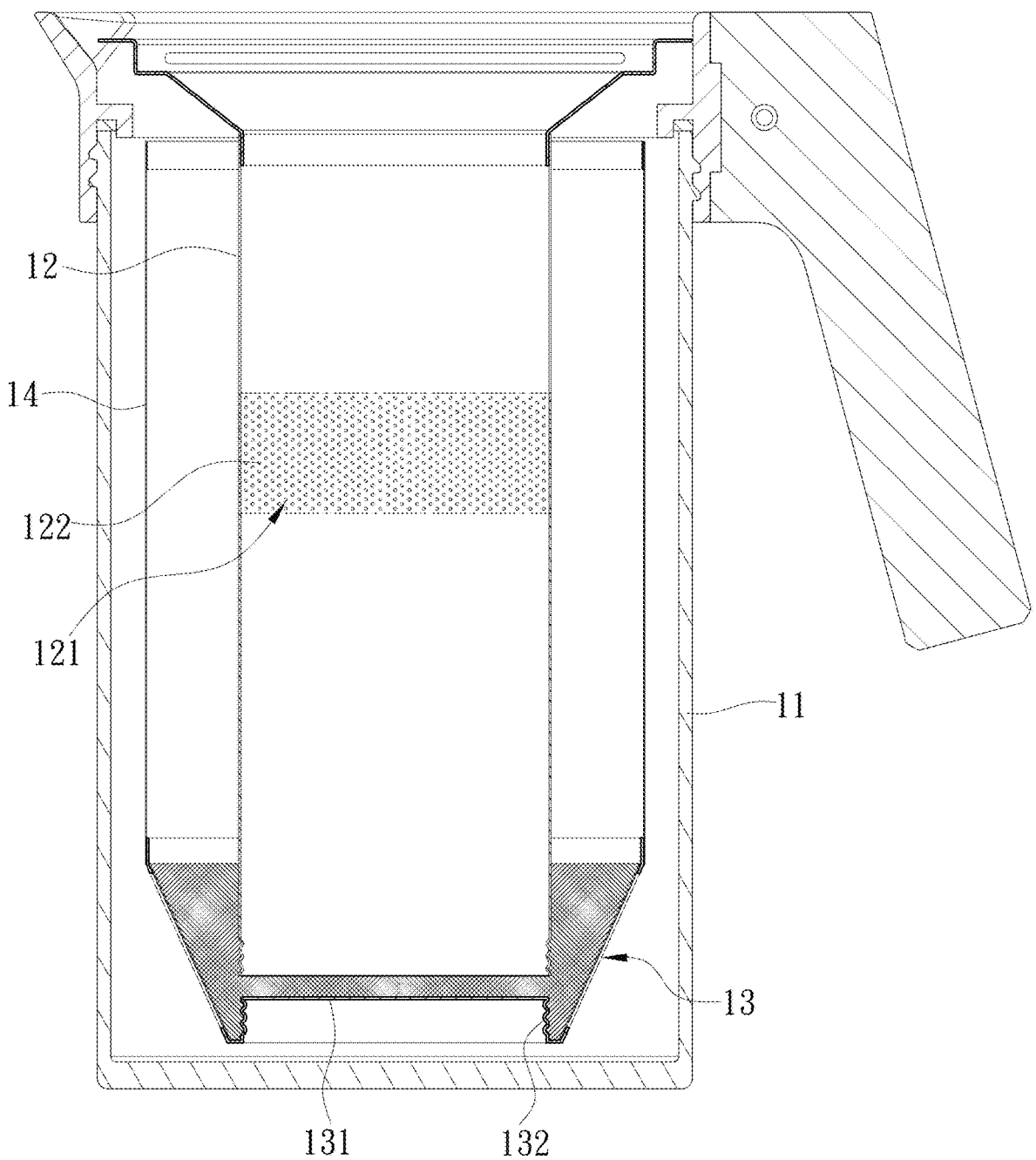
FIG. 5 is a schematic structural cross-sectional view of a further embodiment of the present invention.

Referring to FIG. 1, FIG. 2, FIG. 3, FIG. 4 and FIG. 5, the brewing vessel 10 further comprises a base plate 131 that is connected to the secondary filter 13 and is positioned at the bottom of the inner structure 12. In one embodiment in which the inner structure 12 does not include a sealing cover, the base plate 131 can be implemented as the sealing cover. In one embodiment in which the inner structure 12 includes the sealing cover, the base plate 131 is provided corresponding to the sealing cover. Further, in one embodiment, at least one of the base plate 131 and the bottom of the inner structure 12 contains a connecting structure 132 that is used for assembling the base plate 131 and the inner structure 12 together. In this embodiment, the base plate 131 and the inner structure 12 can be assembled with and disassembled from each other through a spiral design of the connecting structure 132 as shown in FIG. 5.

What is claimed is:

1. A brewing vessel, which comprises
a brewing vessel body; and
an inner structure positioned in the brewing vessel body, wherein the inner structure is provided with a primary filter,
wherein the inner structure is formed in a tubular shape, and the primary filter comprises a plurality of through-holes located along a side surface of the inner structure,
wherein the brewing vessel comprises a secondary filter positioned relative to the inner structure, the secondary filter is a filter screen with a plurality of filtration holes, a mesh of the secondary filter is smaller than that of the primary filter, and the secondary filter filters out at least some coffee sediment that failed to be filtered by the primary filter, wherein the secondary filter is positioned at a bottom of the inner structure,
wherein the brewing vessel comprises an outer structure positioned in the brewing vessel body, wherein the outer structure encloses the inner structure and connects to the secondary filter to restricts liquid flowing out the plurality of through-holes of the primary filter to flow through the secondary filter only, and
wherein a first distance is defined between a bottom of the outer structure and the brewing vessel body, and a second distance is defined between the bottom of the inner structure and the brewing vessel body, and the first distance is unequal to the second distance, wherein two ends of the secondary filter are connected to the bottom of the outer structure and the bottom of the inner structure, respectively, and the secondary filter is positioned at a slanted angle.

2. The brewing vessel as claimed in claim 1, wherein the brewing vessel further comprises a base plate that is connected to the filter screen and is positioned at a bottom of the inner structure.

3. The brewing vessel as claimed in claim 2, wherein at least one of the base plate and the bottom of the inner structure contains a connecting structure, and the inner structure is assembled with or disassembled from the base plate via the connecting structure.

4. The brewing vessel as claimed in claim 1, wherein the brewing vessel further comprises a base plate that is connected to the filter screen and is positioned at a bottom of the inner structure.

5. The brewing vessel as claimed in claim 4, wherein at least one of the base plate and the bottom of the inner structure contains a connecting structure, and the inner structure is assembled with or disassembled from the base plate via the connecting structure.

6. The brewing vessel as claimed in claim 1, wherein the primary filter comprises a plurality of through-holes located along a surface of the inner structure, and the secondary filter is provided with a filter screen.

7. The brewing vessel as claimed in claim 6, wherein the brewing vessel further comprises a base plate that is connected to the filter screen and is positioned at a bottom of the inner structure.

8. The brewing vessel as claimed in claim 7, wherein at least one of the base plate and the bottom of the inner structure contains a connecting structure, and the inner structure is assembled with or disassembled from the base plate via the connecting structure.

* * * * *